United States Patent
Florin

(10) Patent No.: US 9,470,564 B2
(45) Date of Patent: Oct. 18, 2016

(54) MAGNETIC-INDUCTIVE FLOWMETER HAVING-AN EVALUATION CIRCUIT WITH A CROSSTALK VOLTAGE INDICATOR TO INDICATE A "NO-FLOW" STATE

(71) Applicant: KROHNE Messtechnik GmbH, Duisburg (DE)

(72) Inventor: Wilhelm Florin, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 14/666,626

(22) Filed: Mar. 24, 2015

(65) Prior Publication Data

US 2015/0268076 A1 Sep. 24, 2015

(30) Foreign Application Priority Data

Mar. 24, 2014 (DE) .................. 10 2014 004 122

(51) Int. Cl.
G01F 25/00 (2006.01)
G01F 1/58 (2006.01)
G01F 1/60 (2006.01)

(52) U.S. Cl.
CPC ............ *G01F 1/60* (2013.01); *G01F 25/0007* (2013.01)

(58) Field of Classification Search
None
See application file for complete search history.

(56) References Cited

U.S. PATENT DOCUMENTS

| 6,453,754 B1 * | 9/2002 | Florin | ...................... G01F 1/60 73/861 |
| 6,615,149 B1 | 9/2003 | Wehrs | |
| 6,973,839 B2 | 12/2005 | Wray | |
| 7,171,336 B2 | 1/2007 | Brockhaus | |
| 7,265,544 B2 | 9/2007 | Keese et al. | |
| 7,688,057 B2 | 3/2010 | Foss et al. | |
| 2007/0044570 A1 | 3/2007 | Brockhaus et al. | |
| 2009/0071264 A1 | 3/2009 | Wray | |

FOREIGN PATENT DOCUMENTS

| DE | 3810034 | * 10/1989 | ............. G01F 23/26 |
| DE | 10254268 A1 | 6/2004 | |
| JP | 2006234840 A | 9/2006 | |

OTHER PUBLICATIONS

English Translation of DE 3810034, pp. 1-19 including disclosure, claims and drawings done on May 17, 2016.*

* cited by examiner

*Primary Examiner* — Harshad R Patel
(74) *Attorney, Agent, or Firm* — David S. Safran

(57) ABSTRACT

A magnetic-inductive flow meter with at least one measuring tube for through flow of an electrically conductive medium, with a magnetic field generating apparatus for generating an alternating magnetic field which runs at least also perpendicular to the longitudinal axis of the measuring tube, with at least two measuring electrodes which especially contact the medium and with an evaluation circuit, the magnetic field generating apparatus having at least one field coil and one coil power supply. Because the measuring electrode circuit, therefore the electrical circuit to which the measuring electrodes belong is monitored by a crosstalk voltage indicator of the evaluation circuit which is active in an operating state when an electrically conductive medium is not flowing through the measuring tube, whether the measuring electrode circuit is serviceable can be derived from the crosstalk voltage.

8 Claims, 3 Drawing Sheets

MAGNETIC-INDUCTIVE FLOWMETER HAVING-AN EVALUATION CIRCUIT WITH A CROSSTALK VOLTAGE INDICATOR TO INDICATE A "NO-FLOW" STATE

BACKGROUND OF THE INVENTION

1. Field of the Invention

The invention relates to a magnetic-inductive flow meter, with at least one measuring tube for through flow of an electrically conductive medium, with a magnetic field generating apparatus for generating an alternating magnetic field which runs at least also perpendicular to the longitudinal axis of the measuring tube, with at least two measuring electrodes which especially contact the medium, and with an evaluation circuit, the magnetic field generating apparatus having at least one field coil and one coil power supply and the coil power supply preferably having a current controller and preferably one changeover bridge. The invention also relates to a method for operating a magnetic-inductive flow meter of the type as has been described above in particular.

2. Description of Related Art

German Patent Application DE 199 07 864 A1 and corresponding U.S. Pat. No. 6,453,754 B1 disclose a magnetic-inductive flow meter of the above described type. In this known magnetic-inductive flow meter the magnetic field generating apparatus can have one field coil or two field coils. This is why it was stated above that the magnetic field generating apparatus has at least one field coil. In the known magnetic-inductive flow meter, the magnetic field generating apparatus also has a current controller and a changeover bridge. But, because neither a current controller nor a changeover bridge is critical to operation, it was stated above that the magnetic field generating apparatus has preferably one current controller and preferably one changeover bridge.

Magnetic-inductive flow meters have been widely known in the prior art for decades. Reference is made by way of example to the literature citation *Technical Flow Rate Measurement* by Dr. Eng. K. W. Bonfig, 3rd edition, Vulcan-Verlag Essen, 2002, pp. 123 to 167, and moreover, to the literature citation *Principles of Magnetic-Inductive Flow Rate Measurement* by Cert. Eng. Friedrich Hoffmann, 3rd ed., 2003, a publication of the company KROHNE Messtechnik GmbH & Co. KG.

The basic principle of a magnetic-inductive flow meter for measuring the flow rate of a flowing medium goes back to Michael Faraday who suggested the use of the principle of electromagnetic induction for measuring the flow velocity of an electrically conductive medium as early as 1832.

According to the Faraday Induction Law, in a flowing, electrically conductive medium which is permeated by a magnetic field, an electrical field intensity arises perpendicular to the flow direction of the medium and perpendicular to the magnetic field. The Faraday Induction Law is used in magnetic-inductive flow meters in that, by means of a magnetic field generating apparatus which has at least one field coil, conventionally two field coils, a magnetic field which changes over time during a measurement process is generated and the magnetic field at least partially permeates the electrically conductive medium which is flowing through a measuring tube. The generated magnetic field has at least one component perpendicular to the longitudinal axis of the measuring tube and perpendicular to the flow direction of the medium.

It was stated at the beginning that the magnetic-inductive flow meter under discussion includes at least one magnetic field generating apparatus "for producing a magnetic field which runs at least also perpendicular to the longitudinal axis of the measuring tube", while it is pointed out again here that the magnetic field does run preferably perpendicular to the longitudinal axis of the measuring tube and perpendicular to the flow direction of the medium, it is sufficient that one component of the magnetic field runs perpendicular to the longitudinal axis of the measuring tube and perpendicular to the flow direction of the medium.

It was also stated at the beginning that the magnetic-inductive flow meter under discussion includes at least two measuring electrodes which contact especially the medium. These measuring electrodes are used to tap a measurement voltage which has been induced in the flowing medium. Preferably, the virtual connecting line of the two measuring electrodes runs at least essentially perpendicular to the direction of the magnetic field which is permeating the measuring tube perpendicular to the longitudinal axis of the measuring tube, in particular the measuring electrodes can be provided such that their virtual connecting line in fact runs more or less perpendicular to the direction of the magnetic field which permeates the measuring tube.

Finally, it was stated at the beginning that the measuring electrodes can be especially those which contact the medium. In fact, of course, the electrical field intensity generated by induction in the flowing electrically conductive medium can be tapped as measurement voltage by measuring electrodes which are directly, therefore conductively in contact with the medium. But, there are also magnetic-inductive flow meters in which the measurement voltage is not tapped by measuring electrodes which are directly in contact with the medium, therefore not by measuring electrodes which are conductively in contact with the medium, rather the measurement voltage is capacitively detected.

Initially, magnetic-inductive flow meters were operated in the industrial domain with an alternating magnetic field. For reasons of costs, the field coil or the field coils were connected to the existing AC voltage grid so that the magnetic field changes its field intensity essentially sinusoidal. But, the operation of magnetic-inductive flow meters with a magnetic field which essentially sinusoidally changes its field intensity has disadvantages (see, German Patent Application DE 199 07 864 A1, column 1, line 53 to column 2, line 13).

Since the mid-1970s magnetic-inductive flow meters which operate with a switched constant magnetic field in which therefore a switched direct current is used as the coil current have become increasingly popular. If a switched constant magnetic field is used, disadvantages are avoided which occur when a magnetic field is used whose field intensity changes essentially sinusoidally. But, there are also problems when a switched constant magnetic field is used (see in this respect German Patent Application DE 199 07 864 A1, column 2, lines 18 to 41).

The object of the invention which is described in German Patent Application DE 199 07 864 A1 was to configure and develop the known magnetic-inductive flow meter which operates with a switched constant magnetic field such that the explained, system-induced changeover phases are shorter than in the magnetic-inductive flow meters which were known previously in the prior art so that the field frequency, therefore the frequency with which the constant magnetic field is changed over, can be increased (see, German Patent Application DE 199 07 864 A1, column 2, lines 42 to 49).

In particular, in the known magnetic-inductive flow meter there is a boosting current source and a boosting current can be fed into the field coil or into the field coils by means of the boosting current source immediately at the start of each half wave of the coil current which is present as a switched direct current (see, German Patent Application DE 199 07 864 A1, column 2, lines 50 to 57, claim 1, and also the further explanation in column 2, line 58, to column 4, line 7).

Magnetic-inductive flow meters of the type under consideration virtually consist of two functional units. The first functional unit, also called a sensor, includes the measuring tube, the field coil or field coils of the magnetic field generating apparatus and the measuring electrodes. The second functional unit, also called the electronics, includes the coil current supply and the evaluation circuit. Conventionally, the coil current supply and the evaluation circuit are implemented on a printed circuit board or on several printed circuit boards. The first functional unit, therefore the sensor, is generally connected via a cable to the second functional unit, therefore the electronics.

In magnetic-inductive flow meters in which the electronics are located more or less directly on the sensor, compact versions, the cables are rather short. But, there are also embodiments in which the sensor on the one hand and the electronics on the other are separate, remote versions. Here under certain circumstances a rather long cable, with a length of up to 100 m, between the sensor and the electronics, can be necessary.

In safety-relevant applications of magnetic-inductive flow meters and also in safety-relevant applications of other flow meters, for a long time there has been the desire, often also the necessity, of completely monitoring the serviceability of the flow meter. To date, this has only been conditionally possible in magnetic-inductive flow meters.

The field coil circuit, electrical circuit to which the field coil or field coils and the coil current supply belong can be monitored by the electronics both for interruption and also short circuit. The measuring electrode circuit, the electrical circuit to which the measuring electrodes belong, can be monitored for atypical impedance in certain ranges. If an electrically conductive medium is flowing through a magnetic-inductive flow meter of the type under consideration, by modulation of the coil current both the field coil circuit and also the measuring electrode circuit can also be monitored, specifically in that the signals resulting from a modulation of the coil current are evaluated. But, this does not work when an electrically conductive medium is not flowing through the magnetic-inductive flow meter, if therefore the flow rate is zero.

SUMMARY OF THE INVENTION

Proceeding from the above explained prior art and the indicated problem, the object of the invention is, on the one hand, to devise a magnetic-inductive flow meter which can also be completely monitored when an electrically conductive medium is not flowing through the measuring tube, therefore when the flow rate is zero, and on the other hand, to devise a method for operating a magnetic-inductive flow meter with which complete monitoring of the flow meter is also possible when an electrically conductive medium is not flowing through the measuring tube, therefore at flow rate zero.

The magnetic-inductive flow meter in accordance with the invention in which the aforementioned object is achieved is first of all essentially wherein the evaluation circuit has a crosstalk voltage indicator which is active in the "no through-flow" operating state.

In magnetic-inductive flow meters the field coil or field coils must first be operated with a relatively high coil voltage, afterwards with a relatively high coil current, for the brief transient condition of the coil current. This and the fact that the field coil or field coils are mounted in the vicinity of the measuring electrodes as is necessary for operation leads to "crosstalk" occurring especially during the changeover phase, i.e., the crosstalk voltages are transmitted to the measuring electrodes. Attempts are made to minimize this crosstalk, normally by the structure of the sensor, by shielding and by skillful routing of the connection between the sensor and the electronics since the crosstalk can disrupt the normal flow rate measurement.

What is normally attempted to eliminate or in any case to reduce, at this point, is used in accordance with the invention by the normally unwanted crosstalk voltage being measured and monitored, which results in an index of a closed and functioning measuring electrode circuit.

The maximum amplitude of the crosstalk voltage is generally relatively low. Consequently, it is recommended that a sensitive signal-A/D converter be used for measuring the crosstalk voltage.

If only when the amplitude of the crosstalk voltage exceeds a certain value, the measuring electrode circuit is to be assessed as serviceable, it is recommended that, in the evaluation circuit of the magnetic-inductive flow meter in accordance with the invention, a reference value transducer be provided which stores a certain crosstalk voltage as the reference value. In particular, the signal shape-amplitude of the crosstalk voltage can be stored as a reference value.

As stated initially and elsewhere above, the invention also relates to a method for operating a magnetic-inductive flow meter of the initially described type. This method is first of all essentially characterized in accordance with the invention in that when no electrically conductive medium is flowing through the measuring tube the crosstalk voltage is measured and/or monitored and it is derived from the crosstalk voltage whether the measuring electrode circuit is serviceable. Reference is made to the explanation above for what is meant by crosstalk and crosstalk voltage.

Since the maximum amplitude of the crosstalk voltage is generally relatively small, it is recommended that the crosstalk voltage be measured and/or monitored using a sensitive signal-A/D converter.

In magnetic-inductive flow meters of the type under consideration, there are essentially always crosstalk and always crosstalk voltage. But, it can also be feasible to not use very small crosstalk voltage amplitude as an indicator that measuring electrode circuit is serviceable. Consequently, another teaching of this invention is to compare the measured and/or monitored crosstalk voltage with a stored reference value and only when the measured and/or monitored crosstalk voltage is above the reference value, to assess the measuring electrode circuit as serviceable. Here, it is recommended that the signal shape-amplitude of the crosstalk voltage be used as a reference value.

Finally, another teaching of the invention is to change or modulate the triggering of the field current. This makes the signal shape of the crosstalk voltage more easily recognizable.

As described in particular above, there are various possibilities for embodying and developing the magnetic-inductive flow meter and method in accordance with the invention. In this respect, reference is made to the following description in conjunction with the drawings.

DETAILED DESCRIPTION OF THE INVENTION

Figure 1:
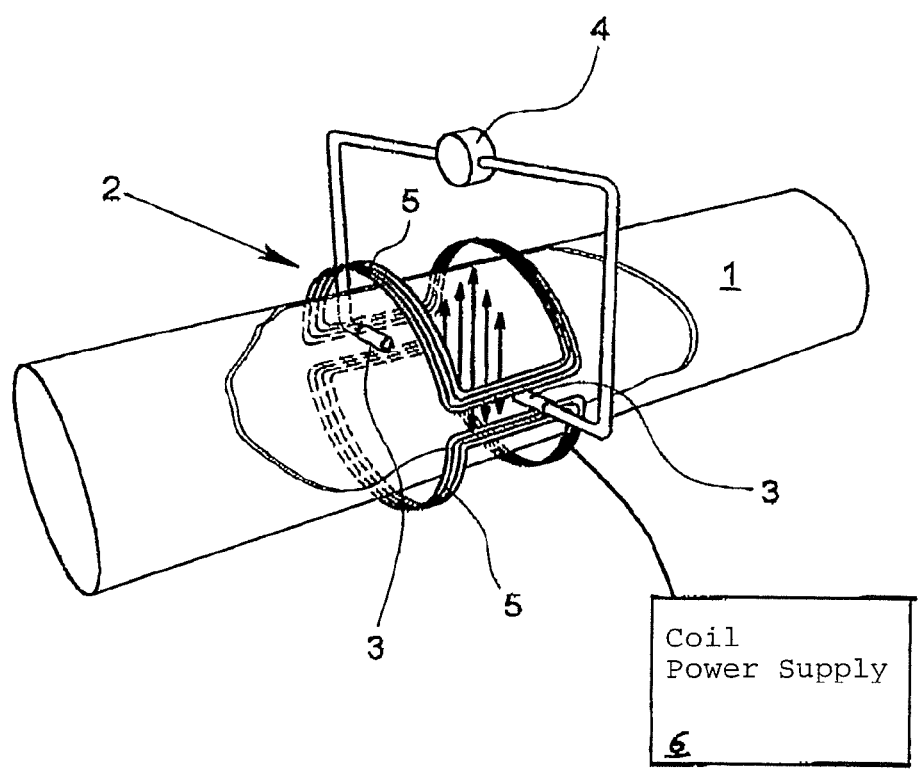
FIG. 1 shows relatively schematically the basic structure of a magnetic-inductive flow meter.

In accordance with the invention, magnetic-inductive flow meters are addressed. Each of these magnetic-inductive flow meters includes at least one measuring tube 1 for the through flow of an electrically conductive medium; this measuring tube 1 is schematically shown only in FIG. 1. Magnetic-inductive flow meters include a magnetic field generating apparatus 2 for producing an alternating magnetic field which runs at least perpendicular to the longitudinal axis of the measuring tube 1, two measuring electrodes 3 which especially contact the medium, and an only very schematically suggested evaluation circuit 4. In the illustrated exemplary embodiment, the magnetic field generating apparatus 2 has two field coils 5 and a coil power supply 6.

In accordance with the invention, the only suggested evaluation circuit 4 has a crosstalk voltage indicator 7 which is active in the operating state "no through flow" and which has a sensitive signal-A/D converter 8. The schematically suggested evaluation circuit 4 can also otherwise have a reference transducer which is which stores a certain crosstalk voltage as a reference voltage.

The magnetic-inductive flow meter in accordance with the invention which was described above only in its basic structure is operated, first of all and essentially, in accordance with the invention such that, when an electrically conductive medium is not flowing through the measuring tube 1, the crosstalk voltage is measured and/or monitored and it is derived from the crosstalk voltage whether the measuring electrode circuit, therefore the electronics to which the measuring electrodes 3 belong, are serviceable. Preferably, the crosstalk voltage is measured and/or monitored using a sensitive signal-A/D converter.

Fundamentally, in magnetic-inductive flow meters of the type under consideration there is always a crosstalk voltage. But, only when the amplitude of the crosstalk voltage exceeds a certain value is the measuring electrode circuit to be assessed as serviceable. For this purpose, is it recommended that the measured and/or monitored crosstalk voltage be compared to a stored reference value in a comparator 10, and only when the measured and/or monitored crosstalk voltage is above the reference value is the measuring electrode circuit assessed as serviceable.

In particular, the signal shape-amplitude of the crosstalk voltage can be used as a reference value.

Figure 2:
FIG. 2 shows a possible characteristic of the field current of a magnetic-inductive flow meter in accordance with the invention.
Figure 3:
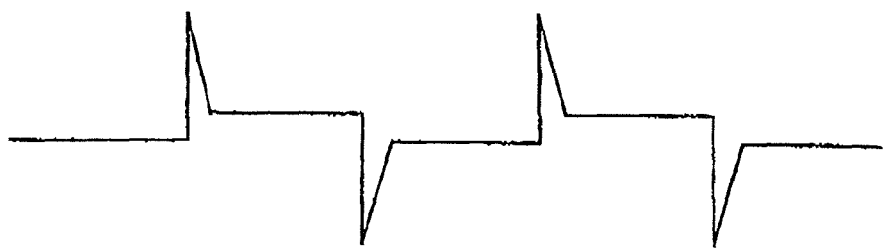
FIG. 3 shows a representation of one possible characteristic of the crosstalk voltage, which representation belongs to the characteristic of the field current according to FIG. 2.
Figure 4:
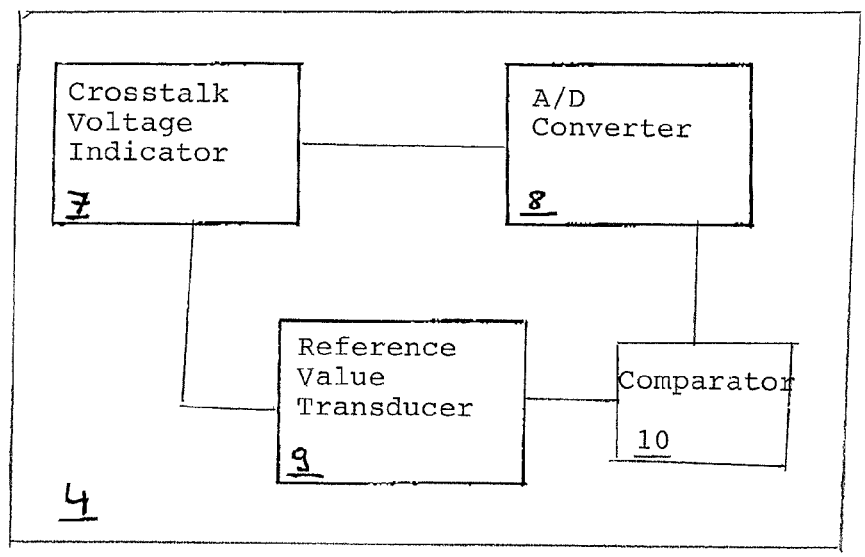
FIG. 4 is a block diagram of an evaluation circuit in accordance with the invention.

FIG. 2 shows one possible characteristic of the field current and FIG. 3 shows characteristics of the crosstalk voltage possible relative to the characteristic of the field current according to FIG. 2.

Additionally, another feature of the invention is to change or modulate the triggering of the field current generated by the magnetic field generating apparatus 2. This makes the signal shape of the crosstalk voltage more easily recognizable.

What is claimed is:

1. A magnetic-inductive flow meter, comprising:
   at least one measuring tube for through flow of an electrically conductive medium,
   a magnetic field generating apparatus for generating an alternating magnetic field which runs at least perpendicular to the longitudinal axis of the measuring tube, the magnetic field generating apparatus having at least one field coil and a coil power supply,
   at least two measuring electrodes which contact the medium, and
   an evaluation circuit,
   wherein the evaluation circuit has a crosstalk voltage indicator which is active in a "no through flow" operating state, the crosstalk voltage indicator being operative for at least one of measuring and monitoring a crosstalk voltage transmitted by the magnetic field generating apparatus to the measuring electrodes.

2. The magnetic-inductive flow meter in accordance with claim 1, wherein the crosstalk voltage indicator has a sensitive signal-A/D converter.

3. The magnetic-inductive flow meter in accordance with claim 1, wherein the evaluation circuit has a reference value transducer which stores a certain crosstalk voltage as a reference value.

4. The magnetic-inductive flow meter according to claim 1, wherein the evaluation circuit is adapted for at least one of measuring and monitoring the crosstalk voltage when an electrically conductive medium is not flowing through the measuring tube and for deriving whether the measuring electrode circuit is serviceable from the crosstalk voltage.

5. The magnetic-inductive flow meter in accordance with claim 4, wherein the crosstalk voltage indicator has a sensitive signal-A/D converter for said at least one of measuring and monitoring of the crosstalk voltage.

6. The magnetic-inductive flow meter in accordance with claim 4, wherein the evaluation circuit is adapted for comparing said at least one of measuring and monitoring of the crosstalk voltage to a stored reference value and for assessing the measuring electrode circuit as serviceable only when said at least one of measuring and monitoring the crosstalk voltage is above the reference value.

7. The magnetic-inductive flow meter in accordance with claim 6, wherein the evaluation circuit is adapted for using a signal shape-amplitude of the crosstalk voltage as the reference value.

8. The magnetic-inductive flow meter in accordance with claim 4, wherein the magnetic field generating apparatus is adapted for changing or modulating triggering of the field current.

* * * * *